(No Model.)
F. BACH.
DEVICE FOR MEASURING LIQUIDS.
No. 329,427. Patented Nov. 3, 1885.
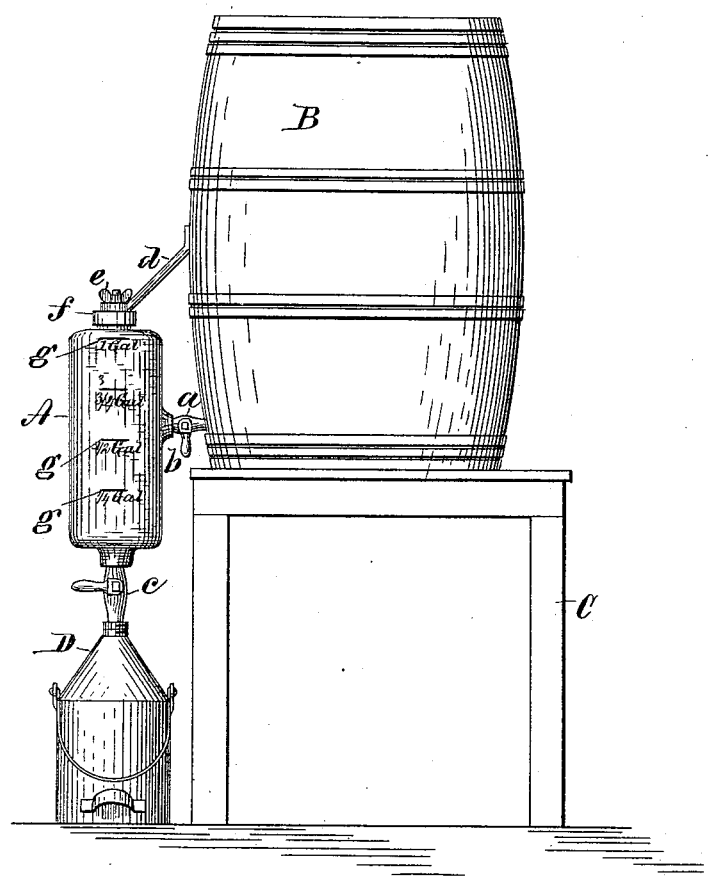
Witnesses
G. M. Gridley
Matthew Schinner
Fred Bach
Inventor
By Ermin & Benedich
Attorneys

UNITED STATES PATENT OFFICE.

FRED BACH, OF CARLTON, WISCONSIN.

DEVICE FOR MEASURING LIQUIDS.

SPECIFICATION forming part of Letters Patent No. 329,427, dated November 3, 1885.

Application filed December 29, 1884. Serial No. 151,424. (No model.)

*To all whom it may concern:*

Be it known that I, FRED BACH, a citizen of the United States, residing at Carlton, in the county of Kewaunee and State of Wisconsin, have invented certain new and useful Improvements in Devices for Measuring Liquids; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention, to be hereinafter claimed, relates to measures for measuring liquids, and may be readily understood by the following description, aided by reference to the accompanying drawing: The measure A is constructed of glass or other transparent material, and is preferably of cylindrical form, though a square or angular shape may be used, if desired. This measure is provided on one side with an orifice, into which one end of a faucet, $a$, is inserted, the other end of the faucet being inserted in a tap-hole in the cask B. The faucet $a$ is provided with a stop-valve operated by the handle $b$. At the bottom the measure has an orifice, into which one end of a faucet, $c$, also provided with a stop-valve, is inserted, while the lower end of this faucet $c$ is open for the free discharge of liquid therefrom into a can, D, or other receptacle. To assist in supporting and staying the measure when connected with a cask by the faucet $a$, as hereinbefore described, I provide the brace $d$, affixed at one end to the cask and at the other end attached to the measure by a bolt and set-screw nut, $e$, or other equivalent means. For convenience of attaching this brace $d$ to the measure, I preferably provide a metal cover, $f$, which cover is secured to the top of the measure by a screw-thread in the manner common in fruit-jars, or by slots and lugs or equivalent means. The cover $f$ has rigid thereto an upwardly-extending screw-threaded bolt passing through an eye in the end of the brace $d$, and receiving thereon the set-screw nut $e$. On the side of the measure are marks $g$, indicating the quantity of liquid in the measure when filled to either of such marks, as in the drawing marks are shown indicating quarter-gallon, half-gallon, three-quarter gallon, and one gallon, respectively.

The marks may be made to indicate gallons, quarts, or pints, or fractions of either or other quantity, as desired.

For venting the measure, the cover is preferably provided with a small aperture against the possibility of an accidentally air-tight-fitting cover.

A common method of using this measure is illustrated in the drawing. The cask B is mounted on a platform, C, and the measure A is attached to the cask in the manner hereinbefore described. The stop-valve in faucet $c$ being closed the stop-valve in faucet $a$ may be opened and liquid be allowed to run into the measure from the cask until the desired quantity, as shown by the mark on the measure, is in the measure, when the stop-valve in faucet $a$ should be closed, and the stop-valve in faucet $c$ opened and allow the liquid to run out into the can D.

This measure is peculiarly well adapted for use with kerosene-oil, spirits, or other freely-flowing liquids.

What I claim as new, and desire to secure by Letters Patent, is—

The transparent-glass measure A, having its top, sides, and bottom constructed in one piece, and provided with quantity-indicating marks $g$ $g$, and with a side inlet-orifice and a bottom discharging-orifice, in combination with the inlet-faucet $a$, provided with stop-valve $b$, the discharging-faucet $c$, provided with a stop-valve, the metallic top $f$, secured to the measure A, and the brace $d$, secured at one end to the metallic top $f$ and at the other end secured to the cask to which the measure is attached, substantially as set forth.

In testimony whereof I affix my signature in presence of two witnesses.

FRED BACH.

Witnesses:
   FRED DISHMAKER,
   ANTON KÜHNL.